W. VANDERBURG & J. VAN GELDER.
ATTACHMENT FOR CORN CULTIVATORS.
APPLICATION FILED NOV. 1, 1915.
1,233,731.
Patented July 17, 1917.
2 SHEETS—SHEET 1.
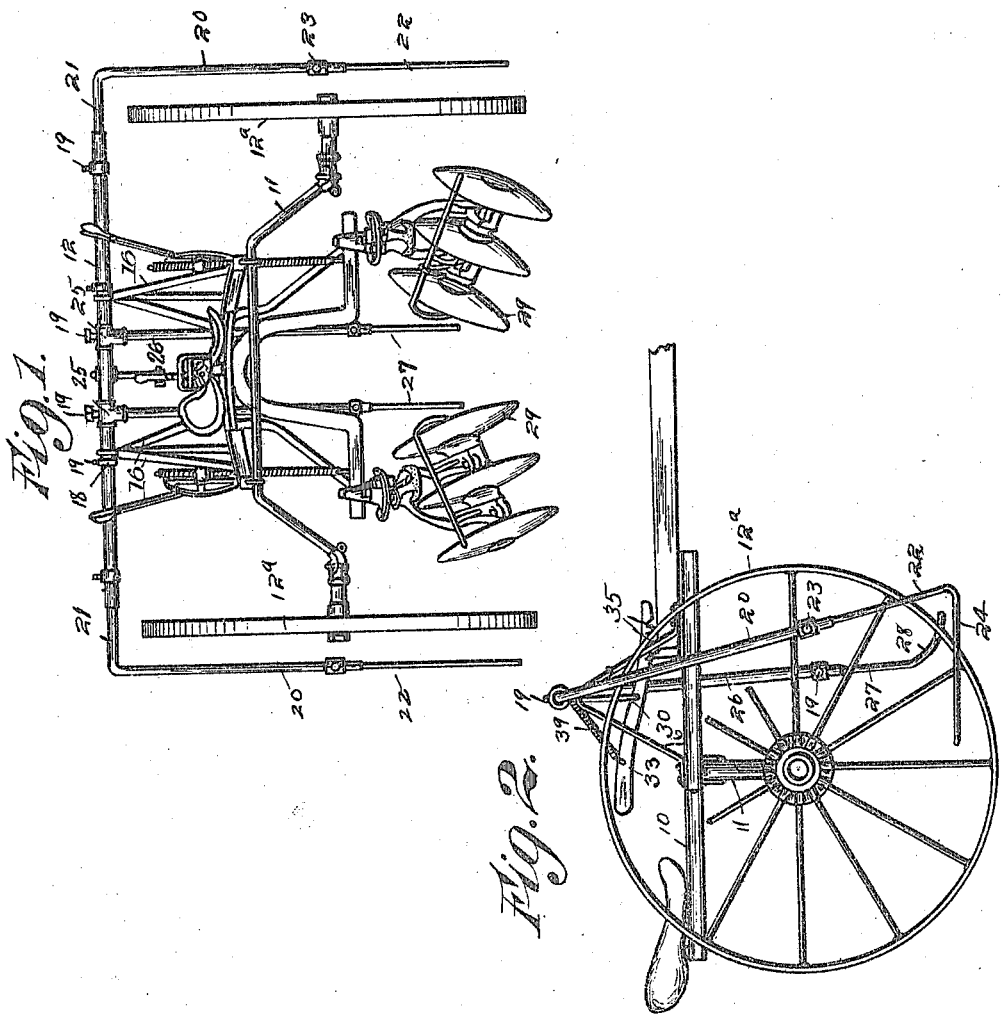

W. VANDERBURG & J. VAN GELDER.
ATTACHMENT FOR CORN CULTIVATORS.
APPLICATION FILED NOV. 1, 1915.
1,233,731.
Patented July 17, 1917.
2 SHEETS—SHEET 2.
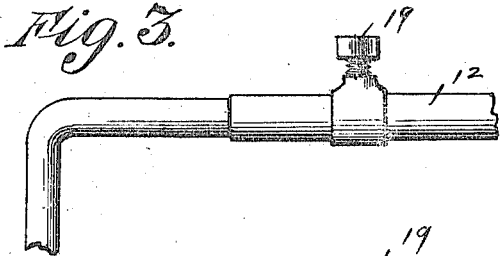
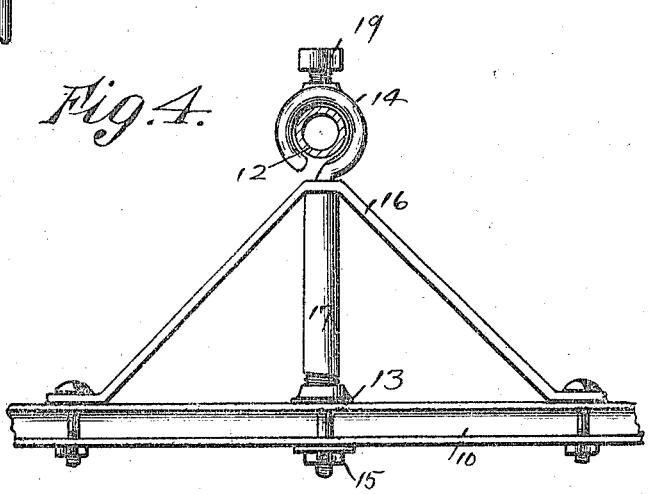
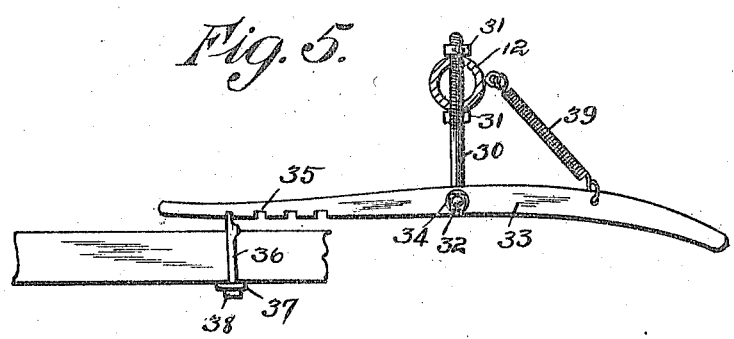
Witnesses:
L. J. Barney
Will Freeman
Inventor:
William Vanderburg
John Van Gelder
By Dwight Bair
Attys.

UNITED STATES PATENT OFFICE.

WILLIAM VANDERBURG AND JOHN VAN GELDER, OF ORANGE CITY, IOWA.

ATTACHMENT FOR CORN-CULTIVATORS.

1,233,731. Specification of Letters Patent. Patented July 17, 1917.

Application filed November 1, 1915. Serial No. 59,100.

*To all whom it may concern:*

Be it known that we, WILLIAM VANDERBURG and JOHN VAN GELDER, citizens of the United States, and residents of Orange City, in the county of Sioux and State of Iowa, have invented a certain new and useful Attachment for Corn-Cultivators, of which the following is a specification.

The object of our invention is to provide an attachment for corn cultivators of simple, durable and inexpensive construction, adapted to pick up fallen stalks of corn, and to guide them away from contact with the wheels of the cultivator, and also from contact with the cultivator disk shovels or the like.

A further object is to provide such an attachment adapted to be mounted on any ordinary cultivator, and capable of adjustment to fit cultivators of various makes.

Still a further object is to provide such an attachment capable of various adjustments for standing in different positions for working in corn of different heights, and to provide such an attachment having a controlling lever, whereby the positions of the arms of the attachment may be varied quickly and easily during the operation of the machine at any time.

Our invention consists in the construction, arrangement and combination of the various parts of the device whereby the objects contemplated are attained, as hereinafter more fully set forth, pointed out in our claims, and illustrated in the accompanying drawings, in which:

Figure 1 shows a rear elevation of a cultivator equipped with an attachment embodying our invention.

Fig. 2 shows a side elevation of the same.

Fig. 3 shows a detail view of the main cross tube.

Fig. 4 shows a detail view of the means for mounting the main tube on the cultivator frame, said main tube being shown in section, and Fig. 5 shows a detail view of the controlling lever for setting the attachment to different position.

In the accompanying drawings, we have used the reference numeral 10 to indicate generally the frame of an ordinary riding cultivator, having the arched axle 11 on the upper ends of which are the wheels 12.

It is well known that under certain weather, soil, and climatic conditions, there are times when many of the corn stalks are bent or knocked down by hail storms, wind storms or the like, and are likely to be torn or broken by the ordinary cultivator. For lifting the corn out of the way of the disks or shovels of the cultivator, we have provided our attachment. In this connection it may be mentioned that we have shown a disk cultivator, but that our attachment may be readily used on a shovel cultivator or any type of cultivator.

Our attachment comprises a main transverse rod or tube 12, located above the cultivator frame. The tube 12 is mounted on the frame of the cultivator in the following manner.

A rod 13 is curved at its upper end to form a portion 14 encircling the tube 12. At its lower end the rod 13 extends through a member of the frame 10, and is screw-threaded to receive a nut 15. A brace 16 receives the upper portion of the rod 13, and extends therefrom in opposite directions, and is secured to the frame of the cultivator. Between the upper portion of the brace 16 and the frame member 10, in which the rod 13 is mounted, is a tubular spacing sleeve 17.

We preferably employ two of the rods 13. In this connection it may be noted that any suitable material may be used for making our improved attachment, and that the method of mounting the same on the frame of the cultivator may be varied in a great variety of ways. It will be noted in this connection, that the rod 12 is permitted rotation within the portion 14 of the rod 13.

On the outside of each member 14 is a collar 18, held in place by a set screw 19. By means of the collars 18 any lateral movement of the tube 12 with relation to the machine is prevented.

Outside of each of the wheels 12ª is an outer arm 20, having at its upper end a horizontal portion 21 telescopically mounted on the tube 12, and detachably held in position by means of a set screw 19, similar to those already described. The arms 20 extend downwardly and forwardly in the machine. Telescopically mounted on the lower ends of the arms 20 are downwardly and forwardly inclined extensions 22, adjustably held in position by means of set screws 23, and having at their lower ends rearwardly inclined portions 24.

Rotatably mounted on the central portion of the tube 12 are two fittings 25 spaced from each other, and having downward cylindrical extensions, into which are secured tubular arms 26. The fittings 25 may be adjustably located in position on the tube 12 by means of set screws 19, such as have been heretofore referred to.

Telescopically mounted on the lower ends of the arms 26 are members 27 extending downwardly and then curved forwardly at 28, as clearly shown in Fig. 2. The members 27 are detachably connected with the arms 26 by means of set screws 19.

The members 28 travel parallel with each other, between and in front of the disks 29 or other cultivating members of the machine. For quickly and easily tilting the device for swinging the arms 20 and 26 forwardly or rearwardly in the machine, we have provided the following means.

A rod 30 is extended through the walls of the tube 12 and is screw threaded to receive nuts 31, above and below said tube 12. At its lower end a portion of the rod 30 is bent at right angles to the body thereof at 32, and is extended through a lever 33 at a point spaced from the ends of said lever. On the end of the portion 32 is an ordinary nut 34. In the forward end of the lever 33 is a plurality of notches 35, adapted to coact with the upper part of a yoke 36 detachably mounted on the front of the frame of the machine by means of a plate 37 received on lower ends of the yoke 36 and nuts 38. A coil spring 39 is secured to the tube 12 and to the rear portion of the lever 33 in any suitable way, for tending to hold the forward end of the lever 33 in engagement with the upper portion of the yoke 36. In this connection it may be mentioned that any suitable device may be used for readily tilting our attachment. In the practical use of our improved attachment for cultivators, the device is installed on an ordinary cultivator in the position above described, the parts being readily adjustable to fit cultivators of different makes.

The arms 26 are mounted on the tube 12 before the tube is mounted on the cultivator, and may be adjusted to any position by means of set screws 19. The extensions 22 may be readily adjusted to suit the height of the machine as desired.

When our device is in use and the cultivator is used in corn in the row being cultivated, the stalks which may be leaning or bent will be caught by the forward curved ends of the members 28 and either raised or inclined forward, so that the leaning or bent stalks are not torn or cut by the machine and especially by the disks or shovel blades.

The corn in the rows outside the machine, which may be leaning toward the row being cultivated, will be engaged by the members 22 and 20 and swung outwardly over the wheel or swung sidewise until they are not struck by the wheel. It should be noted in this connection that the arms 20 and 22, when in actual use, are inclined somewhat more forwardly than shown in Fig. 2, so that leaning stalks of corn in the rows outside the cultivator will strike the arms 20 and 22 instead of the wheel 12$^a$.

Where our improved attachment is used, the leaning or bent corn can be saved from being torn or destroyed by the machine, and it is readily seen from the foregoing description that our attachment can be readily adjusted to be mounted on any ordinary cultivator, and take care of the stalks of corn during any period of the cultivation of the corn.

Some permanent adjustment of the inclination of the arms 26 and 20 is desirable depending upon the height of the corn being cultivated. For quick temporary adjustment during the cultivation, the lever 33 may be employed.

It will be understood that numerous changes may be made in the construction and arrangement of the parts of our improved attachment without departing from its essential features and purposes, and it is our intent to cover by this application any such changes which may be included within the scope of our claims.

We claim as our invention.

1. An attachment for cultivators comprising a transverse member designed to be rotatably mounted on a cultivator, means for securing said member on a cultivator frame in different positions of its rotation, downwardly extending arms mounted on said transverse member and capable of longitudinal adjustment with relation thereto, and arms adjustably mounted on the lower ends of said last described arms.

2. In a device of the class described, a transverse member, means for adjustably mounting said member on a cultivator frame, a pair of members telescopically mounted thereon having downward extensions, means for securing said last members in various positions on their telescopic adjustment on said first member, and a pair of arms telescopically mounted on said downward extensions.

3. In a device of the class described, a transverse member, means for adjustably securing said member on a cultivator frame, a pair of members telescopically mounted thereon having downward extensions, means for securing said last members in various positions of their telescopic adjustment on said first member, a pair of arms telescopically mounted on said downward extensions, a rod secured to said transverse member and extending downwardly therefrom, a lever pivotally secured to said last named rod, and means for coacting with said lever for locking it in various positions of the frame of a cultivator, said means including a spring secured to said lever and to said transverse member.

4. In a device of the class described, a transverse member, means for adjustably securing said member on a cultivator frame in different positions, a pair of members longitudinally adjustable on said first member having downward extensions, means for securing said last members in various positions of their adjustment on said first member, and an arm adjustably mounted on each of said downward extensions having at its lower end an angular extension.

Des Moines, Iowa, August 24, 1915.

WILLIAM VANDERBURG.
JOHN VAN GELDER.

Witnesses:
ANDREW J. KOLYN,
EGBERT WILTERDINK.

Copies of this patent may be obtained for five cents each, by addressing the "Commissioner of Patents, Washington, D. C."